G. B. BROWN.
Carriage Protectors.
No. 139,364.
Patented May 27, 1873.
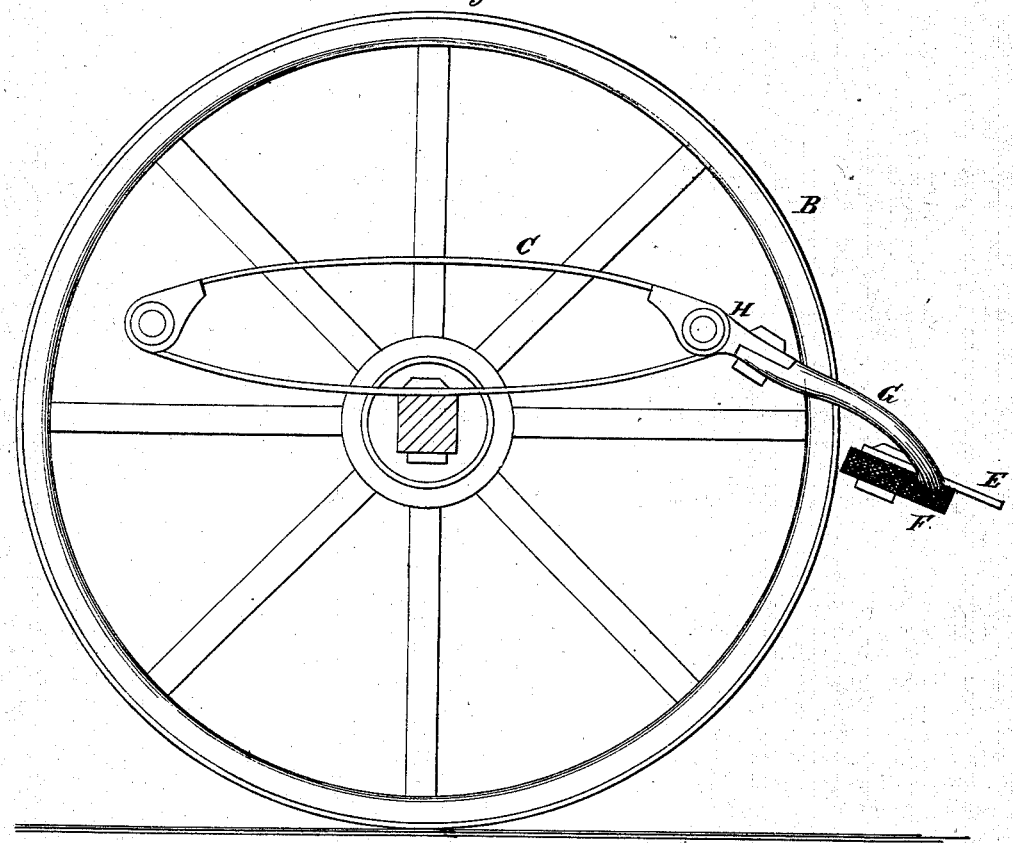
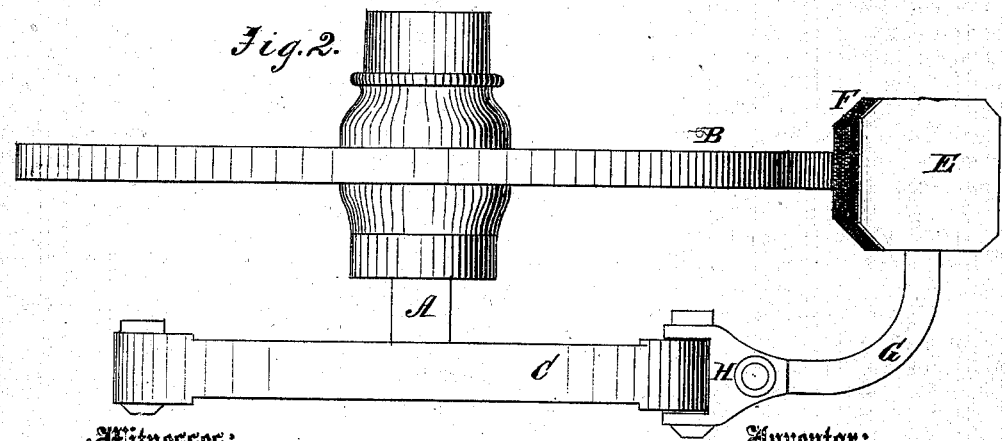

UNITED STATES PATENT OFFICE.

GEORGE B. BROWN, OF NEWBURG, N. Y., ASSIGNOR TO HIMSELF AND LEWIS J. BAZZONI, OF SAME PLACE.

IMPROVEMENT IN CARRIAGE-PROTECTORS.

Specification forming part of Letters Patent No. 139,364, dated May 27, 1873; application filed April 5, 1873.

*To all whom it may concern:*

Be it known that I, GEORGE BRUCE BROWN, of Newburg, in the county of Orange and State of New York, have invented a new and Improved Carriage Protector; and I do hereby declare the following to be a full, clear, and exact description of the same, reference being had to the accompanying drawing forming part of this specification:

The invention relates to a mode of protecting a carriage from becoming soiled and injured through mud and dirt being thrown thereupon by the wheels. It will first be fully described in connection with all that is necessary to a full understanding thereof, and then clearly pointed out in the claim.

Figure 1 is a side elevation, and Fig. 2 is a plan view, showing my invention.

In the drawing, A represents the axle, and B the wheel. C is a spring, usually placed in pleasure vehicles at right angles to the axle. D is my carriage-protector, consisting of a plate, E, placed near the ground, in rear of the wheel, and to the under side of which is clamped detachably and adjustably the rubber F, which is caused to project slightly in rear of wheel. This prevents the grating noise which might otherwise occur from contact with the metal. G is a curved arm, attached by a splice-joint to the bifurcated piece H, which is bolted to the spring C. If the vehicle has a spring parallel to axle, then the arm is brought around and connected with the axle.

The operation is as follows: The mud which rises with the wheel is arrested soon after it leaves the ground, is scraped off, caused to strike the under side of the protector and thus effectually deflected and prevented from soiling the carriage.

Having thus described my invention, what I claim as new and desire to secure by Letters Patent, is—

The combination of the plate E, rubber F, and the curved arm G having a bifurcated piece, H, which is bolted to the end of spring, as and for the purpose set forth.

GEORGE BRUCE BROWN.

Witnesses:
SOLON C. KEMON,
T. DURBIN D. OURAND.